United States Patent
Lim et al.

(10) Patent No.: US 12,073,173 B2
(45) Date of Patent: *Aug. 27, 2024

(54) SYSTEMS AND METHODS FOR INTEGRATING APPLICATION COMPONENTS IN A WEB APPLICATION

(71) Applicant: Capital One Services, LLC, McLean, VA (US)

(72) Inventors: Chengwei Lim, McKinney, TX (US); Sayak Banerjee, Allen, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/349,257

(22) Filed: Jul. 10, 2023

(65) Prior Publication Data
US 2023/0351097 A1 Nov. 2, 2023

Related U.S. Application Data

(63) Continuation of application No. 17/448,061, filed on Sep. 20, 2021, now Pat. No. 11,734,495.

(51) Int. Cl.
*G06F 40/14* (2020.01)
*G06F 16/957* (2019.01)
*G06F 40/166* (2020.01)

(52) U.S. Cl.
CPC .......... *G06F 40/14* (2020.01); *G06F 16/9577* (2019.01); *G06F 40/166* (2020.01)

(58) Field of Classification Search
CPC ..... G06F 40/14; G06F 40/166; G06F 16/9577
See application file for complete search history.

(56) References Cited

U.S. PATENT DOCUMENTS

| 7,827,494 B1 | 11/2010 | Hedayatpour et al. |
| 2003/0055624 A1 | 3/2003 | Fletcher et al. |

(Continued)

OTHER PUBLICATIONS

Luís Takahashi, "Cross micro frontends communication", Oct. 10, 2020, <https://dev.to/luistak/cross-micro-frontends-communication-30m3> (19 pages).

*Primary Examiner* — Thu V Huynh
(74) *Attorney, Agent, or Firm* — Bookoff McAndrews, PLLC

(57) ABSTRACT

Systems and methods for integrating application components in a web application are disclosed. The method includes: executing the web application, the web application configured to display a web page element; receiving, by a library component of the web application, a request from the web application to retrieve a list of one or more application component definitions loadable by the web application; retrieving, by the library component, the list of one or more application component definitions from a manifest; receiving a request to load an application component of the one or more application components; binding, by the library component, attributes and events for each of the one or more application components from the web application; appending the application component into the web page element; and rendering the application component and the web page element using the web browser so that the application component is displayed in the web browser.

20 Claims, 5 Drawing Sheets

(56) References Cited

U.S. PATENT DOCUMENTS

| | | |
|---|---|---|
| 2003/0167315 A1 | 9/2003 | Chowdhry et al. |
| 2005/0120288 A1* | 6/2005 | Boehme ................ G06F 16/954 |
| | | 715/255 |
| 2008/0162206 A1 | 7/2008 | Mak et al. |
| 2012/0210247 A1 | 8/2012 | Khouri et al. |
| 2013/0326046 A1 | 12/2013 | Chan et al. |
| 2015/0143247 A1 | 5/2015 | Diester et al. |
| 2015/0269128 A1* | 9/2015 | Hepper ................... H04L 67/02 |
| | | 715/205 |
| 2017/0034306 A1 | 2/2017 | Thangeswaran |

\* cited by examiner

SYSTEMS AND METHODS FOR INTEGRATING APPLICATION COMPONENTS IN A WEB APPLICATION

CROSS-REFERENCE TO RELATED APPLICATION(S)

This patent application is a continuation of, and claims the benefit of priority to, U.S. Nonprovisional patent application Ser. No. 17/448,061, filed on Sep. 20, 2021, the entirety of which is incorporated herein by reference.

TECHNICAL FIELD

Various embodiments of the present disclosure relate generally to web applications and, more particularly, to systems and methods for integrating application components in a web application.

BACKGROUND

For websites that include multiple web applications, which may provide different functionalities to a user, it is often desirable to maintain consistency in the look and feel of the website when the user navigates from one web application to another within the website. Such websites may include one or more application components, such as micro frontends and/or micro applications. A common landing portal, or host application, may provide a common header, footer, sidebar, and/or other interface element to maintain a consistent look and feel between the various components. The application components may be shared software features that are maintained by federated teams to provide common capabilities to several different host applications.

However, application components may be independently built and deployed by various teams, and thus it may be challenging for host applications to maintain communication between application components. It may also be difficult for the host application to read, understand, and validate a contract (e.g., data elements and/or formats) of the application components, and to monitor the health and performance of individual application components. Further, in current web application architectures, each separate host application may be responsible for loading a script, as well as creating and maintaining the state for each application component. Each host application may also be programmed using a different programming framework. Thus, programming these processes may be repeated for each separate host application in different ways based on the host application and the programming framework used. Therefore, it may be difficult to facilitate communication between various host applications and application components, and to adapt different host applications to changes in the application components.

The present disclosure is directed to addressing one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for integrating application components in a web application.

In one embodiment, a method for integrating application components in a web application is disclosed. The method may include: executing the web application, the web application configured to display a web page element in a web browser; receiving, by a library component of the web application, a request from the web application to retrieve a list of one or more application component definitions loadable by the web application; retrieving, by the library component, the list of one or more application component definitions from a manifest; receiving a request to load an application component of the one or more application components; binding, by the library component, attributes and events for each of the one or more application components from the web application; appending the application component into the web page element; and rendering the application component and the web page element using the web browser so that the application component is configured to be displayed in the web browser as part of the web page element.

In another embodiment, a computer system for integrating application components in a web application is disclosed. The computer system may include: a memory storing instructions; and one or more processors configured to execute the instructions to perform operations including: executing the web application, the web application configured to display a web page element in a web browser; receiving, by a library component of the web application, a request from the web application to retrieve a list of one or more application component definitions loadable by the web application; retrieving, by the library component, the list of one or more application component definitions from a manifest; receiving a request to load an application component of the one or more application components; binding, by the library component, attributes and events for each of the one or more application components from the web application; appending the application component into the web page element; and rendering the application component and the web page element using the web browser so that the application component is configured to be displayed in the web browser as part of the web page element.

In yet another embodiment, a method for integrating application components in a web application is disclosed. The method may include: executing the web application, the web application configured to display a web page element in a web browser; receiving, by a library component of the web application, a request from the web application to retrieve a list of one or more application component definitions loadable by the web application; retrieving, by the library component, the list of one or more application component definitions from a manifest; receiving, by the library component, definitions of inputs for the one or more application components from the web application; validating the attributes and events against a contract for each of the one or more application components, the contract defining allowed inputs and events for a respective application component; receiving a request to load an application component of the one or more application components; binding, by the library component, the attributes and events for each of the one or more application components from the web application; appending the application component into the web page element; and rendering the application component and the web page element using the web browser so that the application component is configured to be displayed in the web browser as part of the web page element.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
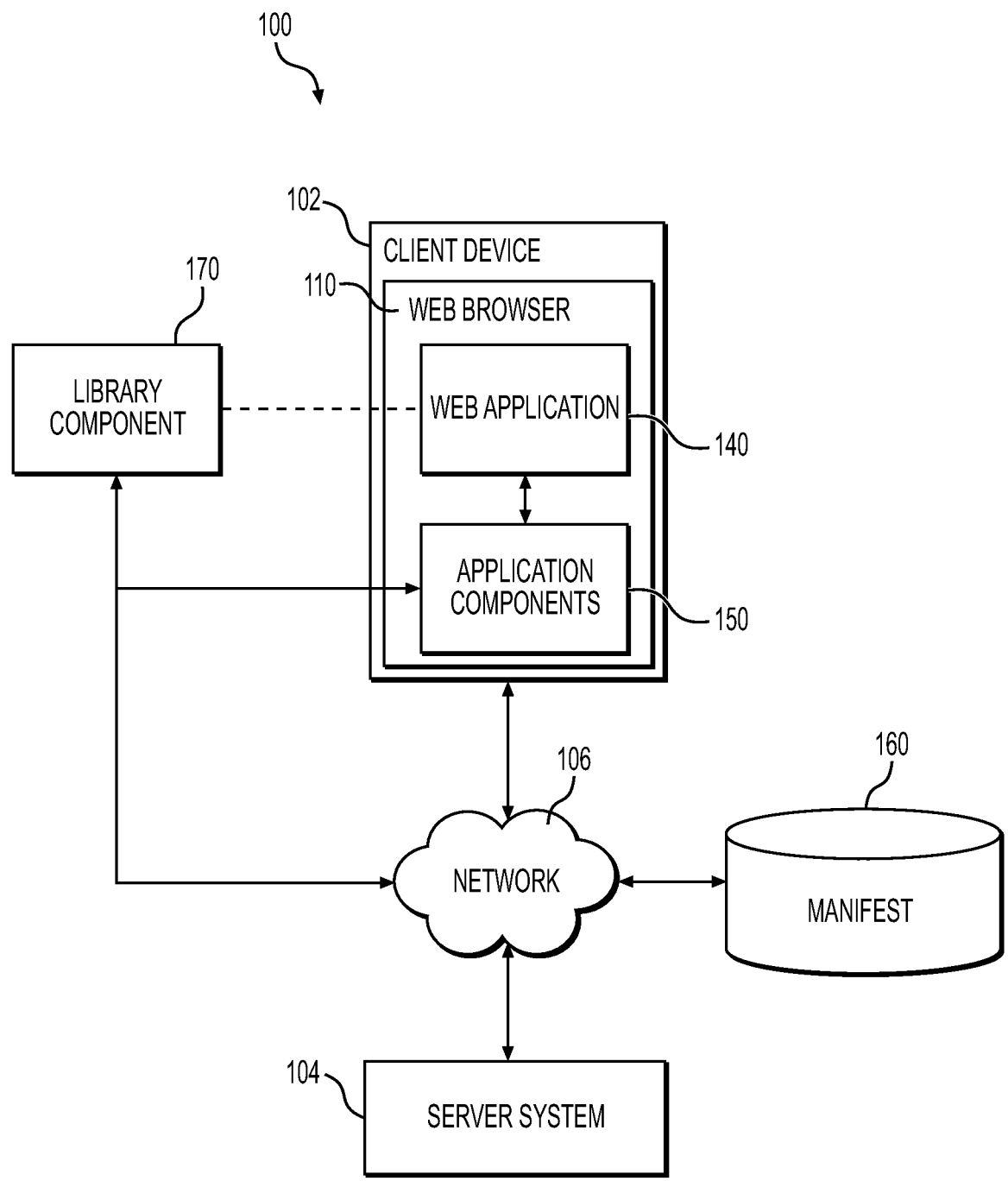
FIG. 1 depicts an exemplary system infrastructure for integrating application components in a web application, according to one or more embodiments.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In the following description, embodiments will be described with reference to the accompanying drawings. As will be discussed in more detail below, a library component of a web application running in a web browser may retrieve code for application components for the web application from a manifest. Thus, the web application may build itself at runtime by pulling in the necessary code via the manifest. The application components may include micro-frontends and/or micro-applications. As used herein "micro-frontends" and "micro-applications" generally encompass small pieces of a web application. For example, micro-frontends and micro-applications may be a single workflow of the web application, a single feature of the web application, or a single widget of the web application. Micro-applications may include one or more micro-frontends. For example, micro-applications may be specialized workflow and micro-frontends may be specialized components within the micro-applications that offer a niche featureset. Further, micro-frontends and micro-applications may be independently developed and deployed by separate development teams. Micro-frontends and micro-applications may be complimentary such that, when combined together, the micro-frontends and/or micro-applications form a feature-rich web application.

Accordingly, the application components may be developed and deployed individually (e.g., by different development teams) via a server system. The code for the application components may be stored by the server system. A link (e.g., a bundle URL) for the source code may be included in the manifest such that the library component may access the code for a respective application component via the link in the manifest and load the code from the server system.

However, integrating the application components into a shell, e.g., a host application may be a repeating process across various host applications. For example, to integrate an application component, each host application generally needs to: import a script to define the component; create a new element for the application component; set initial string attributes or object properties to the element; register event callback functions to handle custom events from the element; attach the element to the host application; and unregister event callback functions when the element is detached.

In addition to the integration process, every host application generally needs to address other common workflows. For example, every host application needs to address communication between different application components and how the host application can pass event details from one application component to another application component even if the other application component is not loaded or instantiated yet. Every host application generally needs to address state management; when an object reference has changed, the host application is required to set the property again to the application component to trigger a property change event on the application component. Every host application must address contract validation. For example, the attributes/properties and events that the host application defines need to be validated against the contract of the application component when integrating the application component into the host application. When the contract is not strictly followed, the application component may not instantiate properly to render itself and events from the application component are not handled. Every host application must also be capable of version control to load the correct version of the application component if the application component is loaded at runtime. Every host application must be programmed to monitor the health and life cycle of the application components. For example, a common matrix can be collected through the life cycle of an application component. The life cycle may include: script loaded, application component attached, application component first rendered, application component detached.

While these steps may be the same or similar across different host applications, the steps may be implemented in different ways depending on the framework (e.g., Angular, React, etc.) used in the host application. Thus, there may be extra effort for each development team to build similar functions and the development time of the website may be increased across different host applications. Further, facilitating communication between application components and the host applications may be inconsistent across different host applications.

Various embodiments of the present disclosure provide for a library component that may act as a gateway for a host application to retrieve approved application components from a manifest, and may be a single channel to facilitate connections and communications between application components. The library component may also monitor the life cycle of an application component on the host application, and may emit a health matrix to underlying monitoring software. The library component may be a lightweight library and may be configured to operate in various host applications regardless of which framework is used. The library component may be a universal component that can be inserted into different host applications and is framework agnostic.

The library component may be a common library that serves as an orchestrator and provides simple interfaces to the host application to, for example, import, create, customize, monitor, manage state, and/or manage communication between application components. The library component may evolve over time and may be upgraded as a dependency in the host application. While new capabilities can be introduced in newer versions, the interface may remain the same for the host application. Thus, in some embodiments, the library component may provide a standardized way for host applications to consume shareable capabilities provided by an application component. The library component may be a shared channel that facilitates connections and communications between application components. Accordingly, the library component may provide a consistent interface so that different host applications can avoid duplicate efforts and focus on the core functionalities of the host application.

Referring now to the drawings, FIG. 1 illustrates a system infrastructure 100 for integrating application components in a web application, according to one or more embodiments of the present disclosure. System infrastructure 100 may include a client device 102 and a server system 104. Client device 102 and server system 104 may communicate with each other through a communication network 106.

Client device 102 may execute a web browser 110 in which web applications may be run. In some instances, web browser 110 may be running a web application, e.g., instances in which the web browser 110 runs the client-side component elements of the web application, even if the web application includes, utilizes, or otherwise involves server-side elements that are run on server system 104. In this disclosure, the term "run" is used interchangeably with "execute."

Web browser 110 may run web applications provided by server system 104. Such web applications may include and/or be associated with one or more web applications 140 including one or more application component(s) 150, as shown in FIG. 1. As will be discussed in more detail below, web applications 140 may provide functionalities for web content navigation, and may cause the client device 102 to display a frontend of application components 150 based on a user command received by the web browser 110.

Server system 104 may store web applications 140 and other applications in a memory of the server system 104. Application components 150 (e.g., code for the application components 150) may also be stored by server system 104 and referenced (e.g., via a link) in a manifest 160, as detailed further below. It is understood that manifest 160 and/or portions of manifest 160 may be stored in the memory of server system 104. Manifest 160, or portions thereof, may also be associated directly with web application 140 (e.g., rather than in a separate database as shown in FIG. 1). Further, manifest 160 may include one or more databases. Application components 150 may include micro-frontends, micro-applications, components of micro-frontends and/or micro-applications, and/or any other types of application components.

A library component 170 may be associated with each web application 140. For example, the library component 170 may be inserted into a respective web application 140 such that the respective web application 140 may access the library component 170. In this way, the library component 170 may form a part of the respective web application 140. The library component 170 may provide a shared channel that facilitates connections and communication between application components 150, as detailed further below. For example, the library component 170 may provide one or more interfaces to web application 140 to perform actions including, for example, import, create, customize, monitor, manage state, and/or manage communication between application components 150. The library component 170 may retrieve a link for the application components 150 from manifest 160 (e.g., and may receive code of the application components 150 via the link from server system 104) and may monitor a life cycle of each application component 150, as detailed further below.

Server system 104 may provide such web applications 140 to client device 102 upon receiving a request from client device 102. For example, server system 104 may execute a web server, which may receive a request sent by web browser 110 to access a particular web application. Upon receiving the request, the web server may invoke an appropriate web application server that services that particular web application. The web server may retrieve, from the web application server, data that is to be provided to web browser 110. Such data may include computer code (e.g., HTML, CSS, JavaScript, and/or media content) that is executable by the web browser 110 to run the client-side components of the web application. For example, the web server may retrieve a link for a particular application component 150 from the manifest 160 via library component 170, as further detailed below. The web server may also provide data that is used by the web application when the web application is running in web browser 110.

Client device 102 may be any suitable computer system. For example, client device 102 may be a desktop or laptop personal computer, or a mobile computing device such as a smartphone, tablet, or wearable computing device. Similarly, server system 104 may be any suitable computer system. For example, server system 104 may have a cloud-computing platform having scalable resources for computation and/or data storage and may perform any of the functionalities of the server system 104 on the cloud computing platform. Communication network 106 may be, for example, the Internet, or a combination of private and/or public network(s).

In various embodiments, the network 106 may be a wide area network ("WAN"), a local area network ("LAN"), personal area network ("PAN"), or the like. In some embodiments, network 106 includes the Internet, and information and data provided between various systems occurs online. "Online" may mean connecting to or accessing source data or information from a location remote from other devices or networks coupled to the Internet. Alternatively, "online"

may refer to connecting or accessing an electronic network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web"). A "website page" generally encompasses a location, data store, or the like that is, for example, hosted and/or operated by a computer system, e.g., the server system 104, so as to be accessible online, and that may include data configured to cause a program such as a web browser to perform operations such as send, receive, or process data, generate a visual display and/or an interactive interface, or the like.

Although depicted as separate components in FIG. 1, it should be understood that a component or portion of a component may, in some embodiments, be integrated with or incorporated into one or more other components. For example, a portion of the server system 104, e.g., a website page provided thereby, may be provided to the client device 102 as an electronic portal. Any suitable arrangement of the various systems and devices of the system infrastructure 100 may be used.

Figure 2:
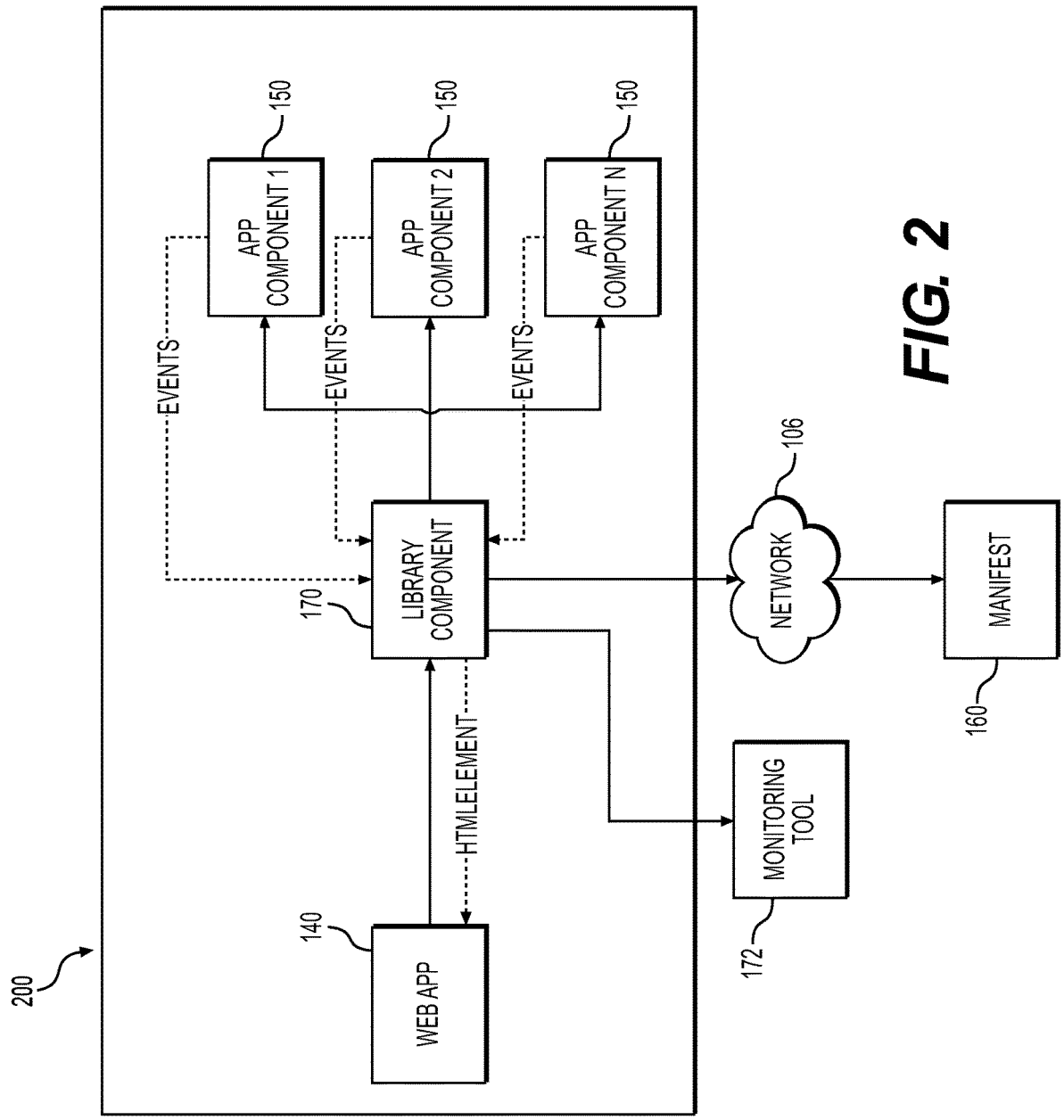
FIG. 2 illustrates a detailed system architecture for integrating application components in a web application, according to one or more embodiments.

FIG. 2 illustrates a detailed system architecture 200 for integrating application components in a web application. As shown in FIG. 2, library component 170 may be in communication with web application 140 and one or more application components 150. While the exemplary embodiment of FIG. 2 illustrates three application components 150 (e.g., App Component 1, App Component 2, App Component N), it is understood that the one or more application components 150 may include any number of application components 150. Library component 170 may also be in communication with manifest 160 through network 106 (e.g., an API gateway). The gateway may include a data exchange gateway that includes a registry for API's and streams that allow communication between frontend components and back end components of web application 140. It is understood that architecture 200 may include any number and any type of communication components for allowing communication between the frontend components and the backend components of the web application 140.

When run in a web browser 110, web application 140 may display a frontend of a host application and/or other user interface components. The host application may include common interface components between various web applications, such as, for example, headers, footers, and the like. The host application of web application 140 may include one or more child applications, such as a micro-application and/or a micro-frontend (e.g., application components 150). For example, after providing an initial web page document to the web browser in response to a page load request received from the web browser, web application 140 may be updated dynamically without requiring the web browser to load an entirely new page. The dynamic update of the web application 140 may be performed using, for example, Asynchronous JavaScript and XML (AJAX), JSON, and/or other JavaScript-based techniques. In some embodiments, the architecture 200 may not include a host application and the child applications may provide the various headers, footers, navigation, and/or other common elements themselves.

Web application 140 may display one or more application components 150, such as one or more child applications, on the web browser's display area. The child applications may include micro-frontends. The child applications may also include micro-applications. In the application architecture described above, the web application 140 (e.g., via the host application) may replace the child application (e.g., the application component 150) that is currently being displayed in the web browser with another one (e.g., a different one) of the one or more child applications, in response to a user interaction with the web browser 110 or the web application 140. Web application 140 may also display multiple child applications at a time, as needed. The display area of the web browser 110 may be defined by a web page element, such as a Document Object Model (DOM) element of the web application 140.

Each of the application components 150 may be loaded from server system 104 (e.g., via a link in the manifest 160), and any one of which, or components thereof, may serve as an example of application components 150 described above in connection with FIG. 1. Thus, the one or more child applications (e.g., application components 150) may respectively provide frontends, or user interface (UI) components, any one of which may be displayed in the viewing area of the web application 140.

In general, a UI component or frontend (e.g., of application components 150), may include any suitable content, such as text, images, videos and/or other media. A UI component may include interactive elements (e.g., clickable links or other interactive graphical user interface elements), which may respond to user-interaction events detected by the web browser 110, such as mouse events (e.g., mouse clicks, mouse movement, etc.). Interactive elements may include, for example, elements that a user may interact with to trigger a request (e.g., an AJAX request) that is sent by the web browser 110 to the server system 104. An application, such as web application 140 or any of the application components 150, may provide a UI component by, for example, defining the UI component and instructing web browser 110 to display the UI component when the respective child application is executed by web browser 110.

The particular content of a UI component may depend on the purpose of the application providing the UI component. In some embodiments, web application 140 may be a portal application, in which case the host application may have portal application functionalities for navigating between pages and/or web application functionalities. For example, the web application 140 and application components 150 may collectively constitute a website. In the instant example, UI components provided by application components 150, respectively, may be different sections of the website (e.g., different sections with different user interaction functionalities), and the frontend of web application 140 may include an interface by which the user may navigate between the different sections. Host application of web application 140 may include common website layout components that the host application may include a header, footer, sidebar, and/or other web page layout element that is commonly displayed regardless of which child web application is being displayed.

Application components 150 may be dynamically loaded as detailed above. For example, when the host application of web application 140 is loaded, the library component 170 may retrieve the child applications (e.g., application components 150) from server system 104 via a link for the respective child applications in manifest 160 that are needed to be displayed for a particular context. To load a particular application component 150, the host application of web application 140 may provide information of the respective application component 150 to library component 170. For example, web application 140 may retrieve a list of application components 150 that the web application 140 is allowed to load. The list may include, for example, a name of the respective application component 150, attributes and/or properties of the respective application component 150, and/or event listeners, as detailed further below. The library component 170 may then access the manifest 160 to obtain a link for the respective application components 150 and may retrieve code for the respective component 150 from server system 104 via the link.

As the user interacts with the web application 140, the host application may determine a new or different child application is needed to be displayed. The library component 170 may then dynamically update the child applications with the new or different child web applications from the server system 104 (e.g., via a respective link in the manifest 160) based on the user interaction. In this embodiment, the host application may load the code for the respective child application and may instantiate the code within the DOM for the host application, as detailed further below. In some embodiments, the host application may utilize a module discovery service, such a bootstrapping service, such that the child application is loaded in the host application. The module discovery may occur once (e.g., during bootstrapping of the web application 140) and/or may occur at periodic intervals based on a respective deployment strategy and a level of complexity of the web application 140.

In some embodiments, web application 140 may determine a particular child application (e.g., application component 150) to be displayed in web browser 110 based on an identifier received from the web browser 110. For example, such an identifier may be a URL indicative of both web application 140 and a particular application component 150. Such a URL may be represented, for example, by the expression "http://myapp/route1" and "http://myapp/route2", where "myapp" represents a hostname or other identifier of web application 140, and "route1" and "route2" represents an identifier of a particular application component 150, respectively, requested by the user to be displayed in web browser 110. That is, a portion of the URL may include an identifier of a particular child application. The hostname may be in any suitable format, such as "www.myapp.com". The child application identifier may be in any suitable format. For example, the child application identifier may be a set of characters following a forward slash. In other examples, the child application identifier may include a URL fragment preceded by a hash tag (#) symbol (e.g., "#route1" for one of the child applications and "#route2" for another one of the child applications).

When the user operates web browser 110 to navigate to the aforementioned URL (e.g., by activating a link or typing the URL into an address bar), if the web application 140 indicated by the URL has not yet been loaded in the web browser 110, web browser 110 may transmit a page load request to server system 104. Server system 104 may then provide the host application to be loaded in web browser 110. If the web application 140 indicated by the URL has already been loaded in web browser 110, the web application 140 may receive the URL when the user operates web browser 110 to navigate to the URL.

When web application 140 has been loaded in web browser 110, web application 140 may read the URL to determine, based on the child application identifier indicated by the URL, the particular child web application corresponding to the child application identifier. The library component 170 may search the manifest 160 for the link or reference to the corresponding child application code, as detailed below. The child application may be dynamically loaded into the existing DOM of the host application. For example, a portion of the DOM of the host application may be replaced. In some examples, the child application may provide a complete DOM (e.g., including headers, footers, navigation, etc.) such that the DOM of the child application serves the entire DOM of the web application 140. The corresponding child application of the determined child application may then be displayed in web browser 110. For example, if the child application identifier corresponds to a first child application, then the web application 140 may display a frontend of the first child application in the viewing area. If the identifier instead corresponds to a second child application, then the web application 140 may display a frontend of the second child web application in the viewing area.

In order for web application 140 to display the child application corresponding to a particular child application, library component 170 (e.g., via server system 104) may retrieve executable code from server system 104 (e.g., via a link in manifest 160) that is usable by client device 102 to render the child application. In general, the executable code for any child application may be loaded onto the client device 102 at any suitable time. For example, it is possible for all of the plurality of the child applications to be loaded onto the client device 102 during the initial page load. In this case, when one of the frontends or UI components of the child application is to be displayed in the viewing area, the web application 140 may display the UI component without having to retrieve the corresponding child application from manifest 160 on demand.

Server system 104 may be configured to provide services for user-interaction functionalities of the respective frontend or UI component, such as the processing (e.g., creating, reading, updating and/or deleting) of data according to user interactions input through the UI component. For example, a user of the web browser 110 that is using an application component 150 may trigger an action resulting in an AJAX request being transferred from the web browser 110 to server system 104. The content of the AJAX request may be provided to the appropriate child application. For example, if the user uses a functionality of the UI component that is serviced by a first child application, the content of the AJAX request may be provided to the first child application servicing the functionality.

To display a respective child application, library component 170 may obtain application code for the respective child application from the server system 104 (e.g., via the link in manifest 160). The manifest 160 may include a link (e.g., a URL) to the code for various child applications. As detailed above, the manifest 160 may include a database of child applications and various attributes and/or properties for the respective child web applications. For example, the manifest 160 may include information about an application component 150 and may be a contract that defines how the application component 150 can be used.

The manifest 160 may include information of, for example, a component identifier, a link (e.g., bundle URL), attributes, properties, events, and/or styles. The component identifier may be a tag that is registered to the HTML DOM as a custom element. The link, or bundle URL, may include a URL of the script to be loaded. When the script is loaded, the application component 150 is defined as a custom HTML element. The link, or bundle URL, may be a source location of the single Javascript bundle. As described above, the link is used by the library component 170 to load the application component 150.

The attributes (e.g., name, preset-value) may include inputs to the application component 150. The inputs may be formatted in String format. The library component 170 validates the name each time the web application 140 attempts to set the attribute. The properties (e.g., name, preset-value, data-structure) may be a property based input. Library component 170 may use properties similarly as attributes and may validate the name and data structure when the web application 140 attempts to set the property. Attributes and properties together may be used to initialize and to interact with the application component 150. The attributes and properties may be tracked inside the application component 150 and may trigger re-rendering when values are reset.

The events (e.g., name and data-structure) may be outputs from the application component 150 and the data structure of the output. An event listener may be a function that will retrieve an event object with data. The library component 170 may validate the event name when the web application 140 adds an event listener to a particular event. The styles may be style sheet language (e.g., CSS) variables that the web application 140 can customize to match the theme.

With reference to FIG. 2, web application 140 may access the manifest 160 via the library component 170 to obtain a list of the component definitions (e.g., contracts) of the application components 150. In this way, the host application of the web application 140 has a list of the application components 150 to which the web application 140 can access, or otherwise load. The web application 140 can provide information of each respective application component 150 to the library component 170. For example, the web application 140 can provide a name of each respective application component 150, the attributes and/or properties of each respective application component 150, and/or event listeners for each application component 150.

The library component 170 can validate, define, and preset the component definitions (e.g., attributes and events) for each application component 150. For example, the manifest 160 may be the input to the library component 170 and the library component 170 may register and/or define the application component 150 by loading the script specified in the bundle URL in the manifest 160. An error may result if the web application 140 requests an application component 150 that is not defined in the manifest 160. When the web application 140 sets additional attributes, properties, or registers event listeners, the library component 170 can validate to confine to the given component definition. Thus, the library component 170 can bind, or otherwise associate, the attributes and events with the respective application component 150. This allows the library component 170 to communicate with each application component 150 and to listen or otherwise record outputs of events from the respective application components 150. For example, the library component 170 may store an output of an event from a first application component 150 in a cache (not shown) and may use the output as an input of a second application component 150 when the second application component 150 is loaded.

Accordingly, the library component 150 may record, or otherwise store, events from each application component 150 and may provide the stored events to other application components 150 as necessary. For example, in an online shopping platform, a user may select a product to purchase through a first application component 150 of web application 140. The event output may be the product placed in a virtual shopping cart, but the shopping cart UI may be provided by a second application component 150 that has not been loaded yet. Library component 170 may store the event output (e.g., the product in the shopping cart). When the user navigates to the shopping cart, library component 170 may load the second application component 150, as detailed above, and provide the event output to the second application component 150. Thus, the shopping cart UI may indicate that the product is in the shopping cart and web application 140 may display the product in the shopping cart via web browser 110. Accordingly, library component 170 may facilitate communication between application components 150 even when a respective application component 150 has yet to be loaded in web application 140.

It is understood that the manifest 160 is not limited to the information described above, and may include any information necessary for describing attributes and/or properties of a respective application component 150.

As further shown in FIG. 2, library component 170 may include a monitoring tool 172. The monitoring tool 172 may enable library component 170 to monitor a life cycle of a respective application component 150. The life cycle of an application component 150 may include indications of when an application component 150 is loaded (e.g., the application component 150 script is loaded using the bundle URL and the application component 150 is ready in the DOM), an application component 150 is attached to the web application (e.g., attached to the DOM), an application component 150 is first rendered (e.g., the frontend of the application component 15—is rendered and displayed), an application components 150 is re-rendered (e.g., bound attributes or properties have been changed and the frontend has been re-rendered), and/or an application component 150 is detached from web application 140 (e.g., the application component 150 has been detached from the current position in the DOM). The library component 170 may output a health matrix to a designated API that describes the life cycle of each of the one or more application components 150. For example, the health matrix may be displayed in web browser 110, in another application of client device 102, and/or may be displayed on another device, separate from client device 102.

Figure 3:
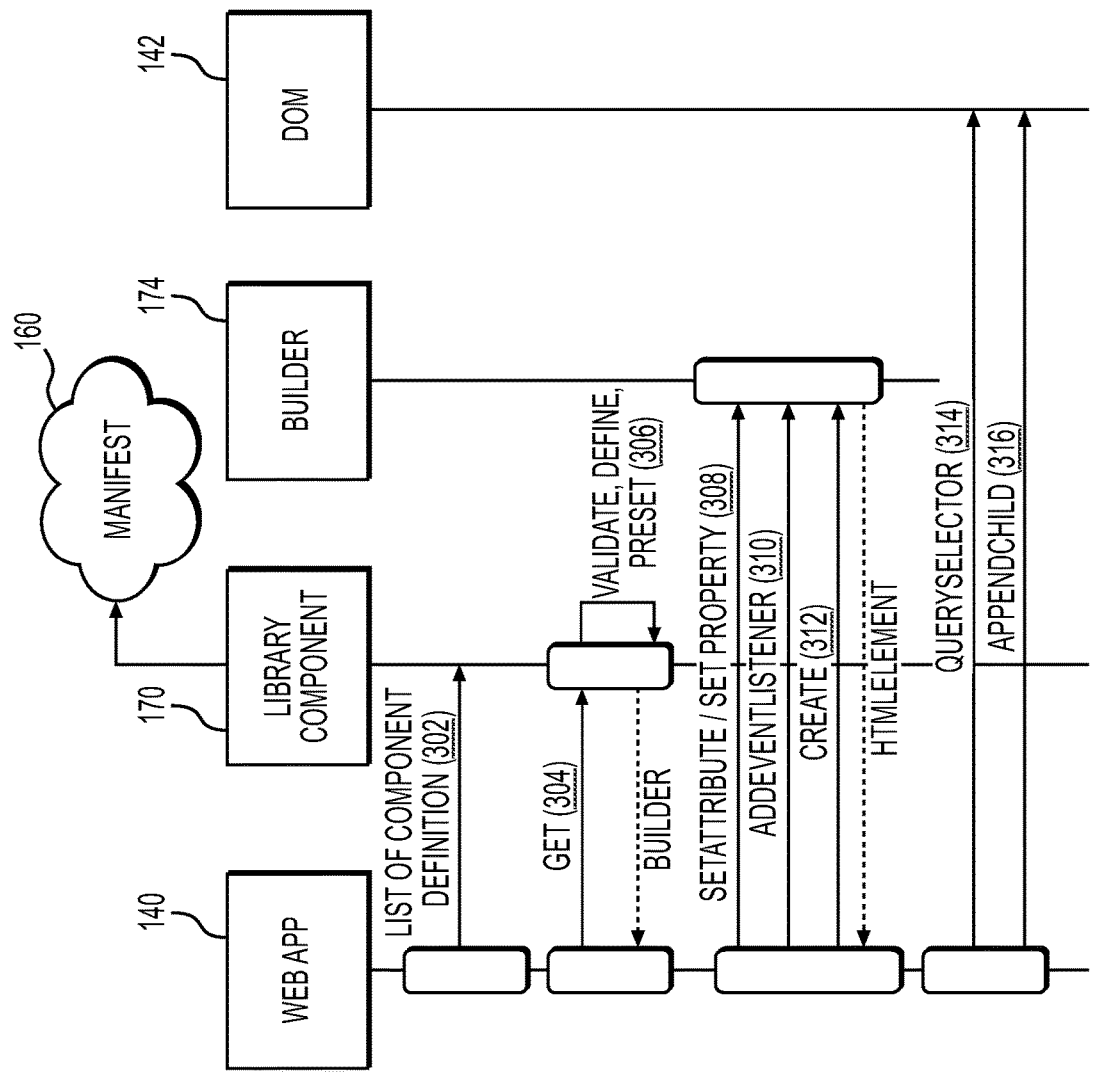
FIG. 3 is a sequence diagram illustrating interactions between a web application and a library component, according to one or more embodiments.

FIG. 3 is a sequence diagram illustrating interactions between a web application 140 and a library component 170. In step 302 and step 304, web application 140 may send a list of component definitions of the respective application components 150 to library component 170. Step 302 and step 304 may encompass a bootstrapping phase. For example, in step 302, the library component 170 may receive the manifest 160, either directly from web application 140 or may discover the manifest 160 from a service. In step 304, the web application 140 may get a hold of an application component 150 using the component identifier. In step 306, the library component 170 may validate, define, and preset the component definitions. For example, the library component 170 may load the bundle URL which registers (or defines) the application component 150 and makes it known to the browser as a custom HTML tag. The library component 170 may be aware of the default value of some attributes for the web application 140 from the component definition. The library component 170 may pre-set these values to the application component 150 without web application 140 (e.g., the host application) explicitly setting the values. The web application 140 may set the attributes, properties and listen/bind to the events via the library component 170. The library component 170 may validate attributes/properties/events which are confined to the component definition.

When the component definitions have been validated, the library component 170 may bind the attributes and events for each application component 150 to the web application 140. For example, in step 308, web application 140 may set attributes and/or properties for each respective application component 150, as detailed above. For example, the web application 140 may provide the attributes/properties to the builder 174 and the builder 174 may validate the name and value of the respective attributes/properties. In step 310, web application 140 may also add event listeners to define which events library component 170 will monitor and store for use as input with the other application components 150, as detailed above. For example, the web application 140 may provide functions as event listeners for the events that the host application is interested to track and handle, and the builder 174 may validate the name of the event. In step 312, web application 140 may create the event listeners. A library component builder 174 may receive the attributes, properties, and event listeners and build the event listeners and definitions for the respective application components 150. The builder may send an HTML element with the built event listeners and definitions to the web application 140. In this way, the web application 140 may be aware of the event listeners that have been created. The web application 140 may ask the builder 174 to create the application component 150, the builder 174 creates the application component 150, sets the attributes/properties to the application component 150, and attaches event listeners to the application component 150. The builder 174 then returns the application component 150.

The library component 170 may then append the respective application component 150 to the document object model (DOM) 142 of the web application 140, as detailed above, to display the respective application component 150 in web browser 110 (steps 314 and 316). For example, during runtime, the web application 140 may insert the code for a respective application component into the DOM 142 of the web application 140, as detailed above. Thus, each application component 150 (e.g., child application) may be developed and deployed independently and may be served on-demand as a micro-frontend, micro-application, or other type of application component. Accordingly, library component 170 may build the website at runtime using the manifest 160.

Accordingly, library component 170 may provide a consistent, universal component that may be inserted into various types of web applications 140 to facilitate communication between application components 150 and between the applications components 150 and the host application of web application 140.

Figure 4:
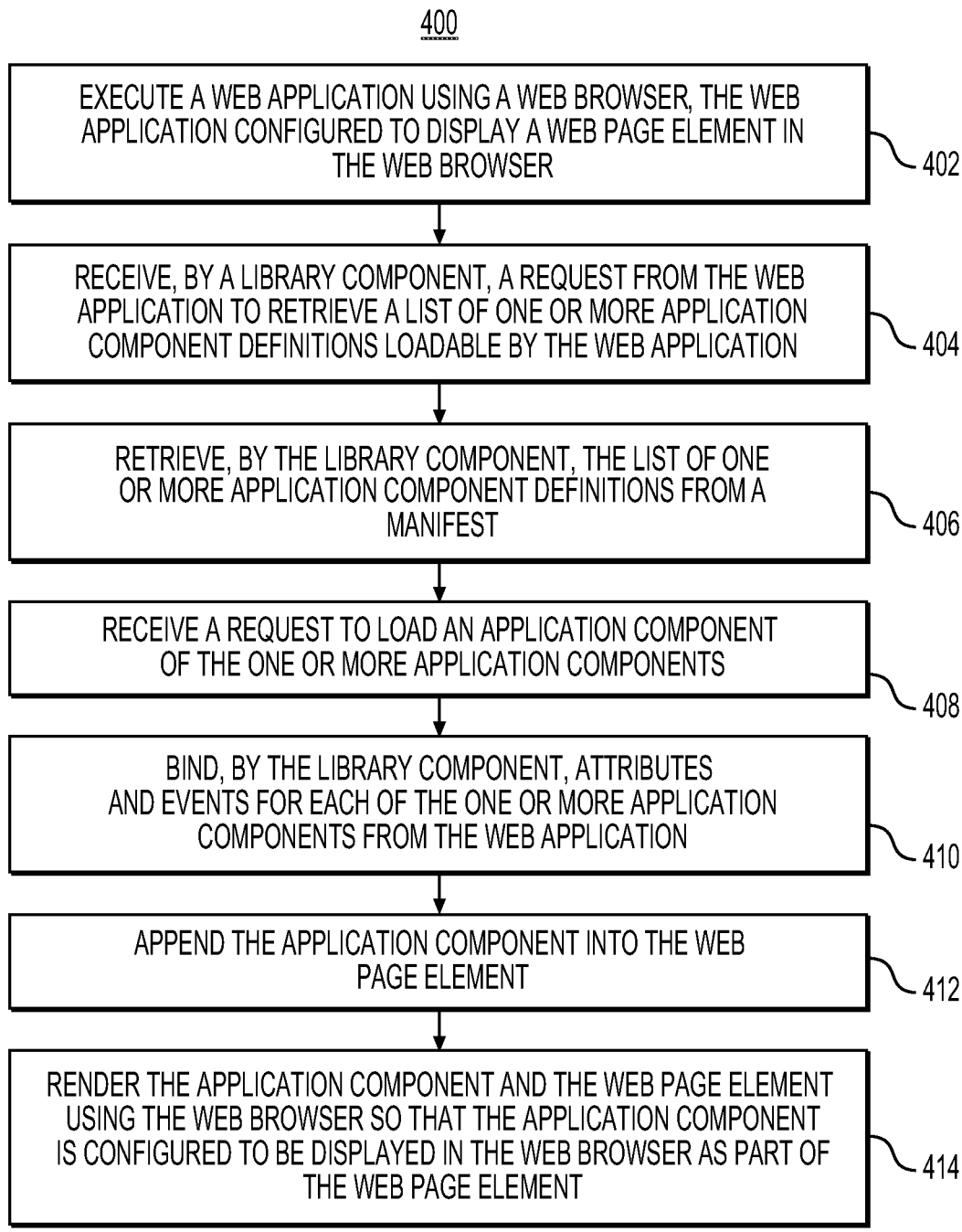
FIG. 4 is a flowchart illustrating a method for integrating application components in a web application, according to one or more embodiments.

FIG. 4 is a flowchart illustrating a method 400 for integrating application components 150 in a web application 140. The method 400 may be performed by client device 102 and/or server system 104. In some embodiments, client device 102 and/or server system 104 may be configured to perform the method by executing instructions. Such instructions may be stored in any suitable computer-readable medium. The method illustrated by FIG. 4 may incorporate any of the techniques and methodologies discussed above in connection with FIGS. 1-3, where context permits. In the methods below, various acts are described as performed or executed by a component from FIG. 1, such as the server system 104, the client device 102, or components thereof. However, it should be understood that in various embodiments, various components of the system infrastructure 100 discussed above may execute instructions or perform acts including the acts discussed below. Further, it should be understood that in various embodiments, various steps may be added, omitted, and/or rearranged in any suitable manner.

Step 402 may include executing a web application 140 using a web browser 110, the web application 140 configured to display a web page element (e.g., via a DOM 142) in a web browser 110.

Step 404 may include receiving, by library component 170, a request from web application 140 to retrieve a list of one or more application component definitions loadable by the web application 140. For example, web application 140 may request library component 170 to retrieve the component definitions from manifest 160 for each application component 150 to which web application 140 may access (e.g., a list of each application component 150 for which web application 140 is whitelisted).

Step 406 may include retrieving, by the library component 170, the list of one or more application component definitions from manifest 160.

Step 408 may include receiving a request to load an application component 150 of the one or more application components 150

Step 410 may include binding, by the library component 170, attributes and events for each of the one or more application components 150 from the web application 140. Library component 170 may also receive definitions of inputs and event listeners to handle the events for the one or more applications components 150 from the web application 140. The web application 140 may register the attributes and event listeners for each of the one or more application components 150. In some embodiments, library component 170 may validate the attributes and events against a contract for each of the one or more application components 150. The contract may define allowed inputs and events for a respective application component 150, as detailed above. In some embodiments, library component 170 may adjust styles of each of the one or more application components 150 to match styles of the web application 140.

Step 412 may include appending the application component 150 into the web page element (e.g., DOM 142).

Step 414 may include rendering the application component 150 and the web page element using the web browser 110 so that the application component 150 is configured to be displayed in the web browser 110 as part of the web page element.

In some embodiments, library component 170 may receive data from an event (e.g., an output) from a first application component 150 and store the data from the event in a cache, as detailed above. When a second application component 150 is loaded by web application 140, library component 170 may send the data from the event from the cache to the second application component 150. In this way, the second application component 150 may use the event as an input. Library component 170 may then append the second application component 150 into the web page element. Library component 170 may also render the second application component 150 and the web page element using the web browser 110 so that the second application component 150 is configured to be displayed in the web browser 110 as part of the web page element.

It is noted that, in general, the methods illustrated by FIG. 4 may incorporate any of the techniques and methodologies discussed above in connection with FIGS. 1-3, wherever context permits. Further, it is noted that while web application 140 and application components 150 are referred to as web applications in various embodiments, the teachings herein may also be applied to other types of applications. Therefore, web application 140 and application components 150 may, in general, also be referred to as applications that run on client device 102.

In some embodiments, library component 170 may monitor a life cycle of each of the one or more application components 150, as detailed above. The life cycle may include one or more of an application component 150 loaded, an application component 150 attached to the web application 140, an application component 150 first rendered, or an application component 150 detached from the web application 140. The library component 170 may output a health matrix describing the life cycle of each of the one or more application components 150.

In general, any method discussed in this disclosure that is understood to be computer-implementable, such as the methods described in connection with FIG. 4, may be performed by one or more processors of a computer system, such as client device 102 and/or server system 104, as described above. A method or method step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or another type of processing unit.

A computer system, such as client device 102 and/or server system 104, may include one or more computing devices. If the one or more processors of the computer system is implemented as a plurality of processors, the plurality of processors may be included in a single computing device or distributed among a plurality of computing devices. If a computer system comprises a plurality of computing devices, the memory of the computer system may include the respective memory of each computing device of the plurality of computing devices.

Figure 5:
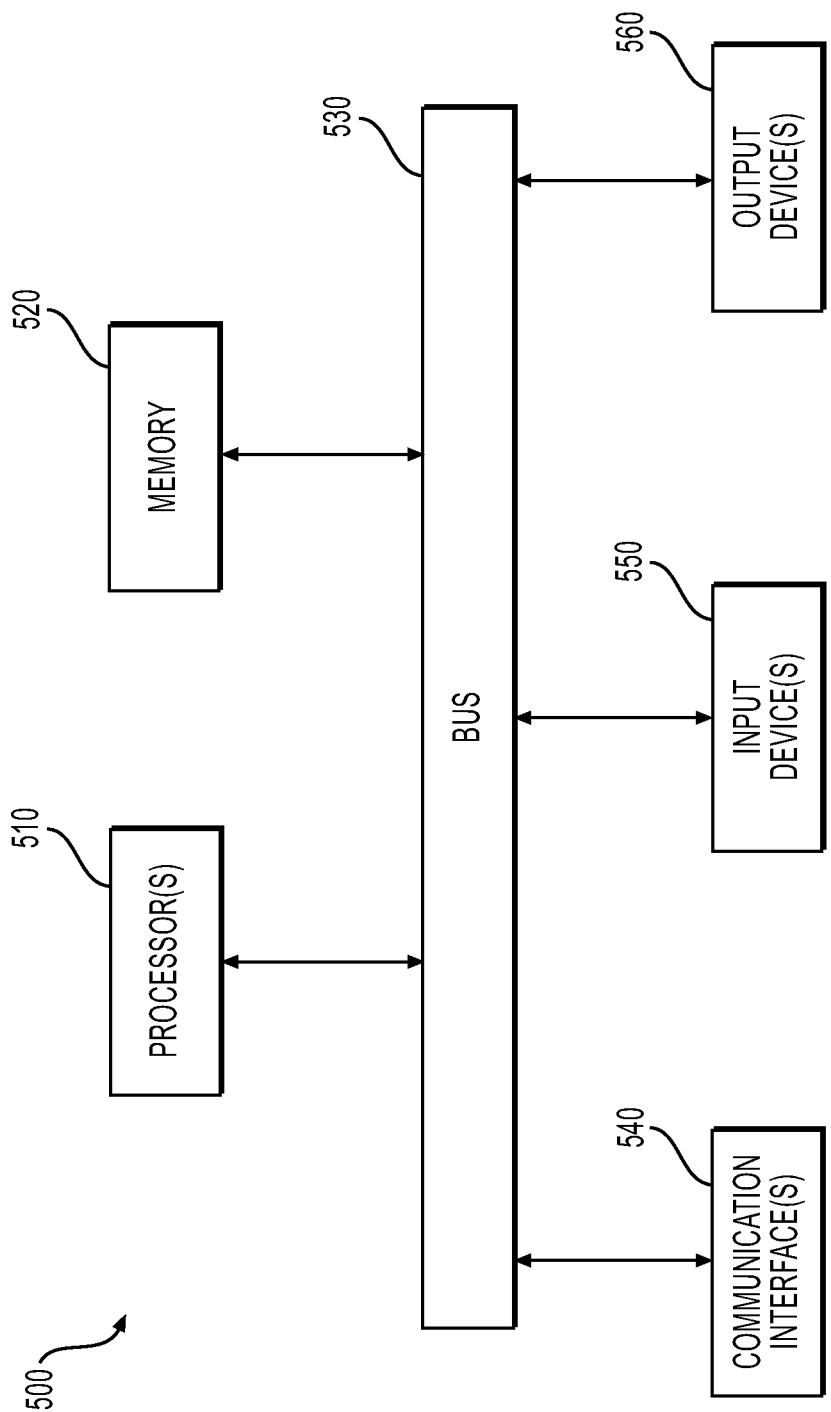
FIG. 5 illustrates a computing device, according to one or more embodiments.

FIG. 5 illustrates an example of a computing device 500 of a computer system. The computing device 500 may include processor(s) 510 (e.g., CPU, GPU, or other processing unit), a memory 520, and communication interface(s) 540 (e.g., a network interface) to communicate with other devices. Memory 520 may include volatile memory, such as RAM, and/or non-volatile memory, such as ROM and storage media. Examples of storage media include solid-state storage media (e.g., solid state drives and/or removable flash memory), optical storage media (e.g., optical discs), and/or magnetic storage media (e.g., hard disk drives). The aforementioned instructions (e.g., software or computer-readable code) may be stored in any volatile and/or non-volatile memory component of memory 520. The computing device 500 may, in some embodiments, further include input device(s) 550 (e.g., a keyboard, mouse, or touchscreen) and output device(s) 560 (e.g., a display, printer). The aforementioned elements of the computing device 500 may be connected to one another through a bus 530, which represents one or more busses.

Instructions executable by one or more processors may be stored on a non-transitory computer-readable medium. Therefore, whenever a computer-implemented method is described in this disclosure, this disclosure shall also be understood as describing a non-transitory computer-readable medium storing instructions that, when executed by one or more processors, configure and/or cause the one or more processors to perform the computer-implemented method. Examples of non-transitory computer-readable medium include RAM, ROM, solid-state storage media (e.g., solid state drives), optical storage media (e.g., optical discs), and magnetic storage media (e.g., hard disk drives). A non-transitory computer-readable medium may be part of the memory of a computer system or separate from any computer system.

It should be appreciated that in the above description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the disclosure, and it is intended to claim all such changes and modifications as falling within the scope of the disclosure. For example, functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted. The scope of the invention should be determined not by the embodiments illustrated, but by the appended claims and their equivalents.

What is claimed is:

1. A computer-implemented method for integrating web application components, the method comprising:
receiving, from a client device executing a web application in a web browser, a request to load a first application component from a plurality of application components loadable by the web application, wherein each of the plurality of application components have defined attributes and events;
receiving first code for the first application component;
providing the first code to the client device to enable loading of the first application component by the web application, wherein, upon loading, the first application component is rendered for display by the web application in the web browser based on the first code;

receiving event data output from one of the events defined for the first application component based on an action performed via the displayed first application component;

storing the event data in a cache when at least a second application component from the plurality of application components, for which the event data is identified as an input of the second application component based on one of the attributes defined for the second application component, has yet to be loaded by the web application;

subsequent to the storing of the event data in the cache, receiving a request from the client device to load the second application component; and based on the event data being identified as the input and in response to the second application component being loaded by the web application, providing the stored event data to the second application component for use as the input.

2. The computer-implemented method of claim 1, wherein receiving the first code for the first application component comprises:

receiving, from a data store configured to store information associated with each of the plurality of application components, a link to the first code; and accessing the first code using the link.

3. The computer-implemented method of claim 1, further comprising:

receiving a contract for each of the plurality of application components; and validating the attributes and events defined for each of the plurality of application components based on the contract.

4. The computer-implemented method of claim 3, wherein the contract defines allowed attributes and events for each of the plurality of application components.

5. The computer-implemented method of claim 4, further comprising:

adjusting a style of each of the plurality of application components to match a style of the web application.

6. The computer-implemented method of claim 1, wherein the web application is configured to display a web page element in the web browser, and the first application component is appended into the web page element by the web application such that when the first application component is rendered for display by the web application, the first application component is displayed in the web browser as part of the web page element.

7. The computer-implemented method of claim 6, wherein, in response to the second application component being loaded by the web application, the second application component is appended into the web page element and replaces the first application component as part of the web page element displayed in the web browser.

8. The computer-implemented method of claim 6, wherein, in response to the second application component being loaded by the web application, the second application component is appended to the web page element and displayed at a same time as the first application component as part of the web page element.

9. The computer-implemented method of claim 1, wherein the attributes and events defined for each of the plurality of application components are registered, and receiving the event data output from the one of the events defined for the first application component is based on the registering.

10. The computer-implemented method of claim 1, wherein the attributes and events defined for each of the plurality of application components are registered, and the event data is identified as the input of the second application component based on the registering.

11. The computer-implemented method of claim 1, further comprising:

monitoring a life cycle of the first application component, the life cycle including one or more of the loading of the first application component by the web application, an appending of the first application component into a web page element, a first instance of the rendering of the first application component, or a detaching of the first application component from the web application.

12. The computer-implemented method of claim 11, further comprising:

generating a health matrix based on the monitoring.

13. A computer-implemented method for integrating web application components, the method comprising:

receiving, from a client device executing a web application that is configured to display a web page element in a web browser, a request to load a first application component from a plurality of application components loadable by the web application;

receiving, from a data store, information associated with the first application component, wherein the data store is configured to store information associated with each of the plurality of application components, including attributes and events defined for each of the plurality of application components;

providing at least a portion of the information associated with the first application component to the client device to enable loading of the first application component by the web application, wherein, upon loading, the first application component is rendered for display by the web application in the web browser as part of the web page element;

receiving event data output from one of the events defined for the first application component in the data store based on an action performed via the displayed first application component;

storing the event data in a cache when at least a second application component from the plurality of application components, for which the event data is identified as an input of the second application component based on one of the attributes defined for the second application component in the data store, has yet to be loaded by the web application;

subsequent to the storing of the event data in the cache, receiving a request from the client device to load the second application component; and based on the event data being identified as the input, providing the stored event data to the second application component for use as the input in response to the second application component being loaded and rendered for display by the web application in the web browser as part of the web page element.

14. The computer-implemented method of claim 13, wherein the information associated with the first application component includes a link to first code for the first application component, and providing at least the portion of the information associated with the first application component to the client device to enable loading of the first application component by the web application comprises:

using the link to access the first code; and providing the first code to the client device.

15. The computer-implemented method of claim 13, further comprising:
registering the attributes and events defined for each of the plurality of application components in the data store, wherein the event data output from the one of the events defined for the first application component is received based on the registering, and the event data is identified as the input of the second application component based on the registering.

16. The computer-implemented method of claim 13, further comprising:
receiving a contract for each of the plurality of application components; and
validating the attributes and events defined for each of the plurality of application components based on the contract.

17. The computer-implemented method of claim 13, further comprising:
monitoring a life cycle of the first application component; and
generating a health matrix based on the monitoring.

18. The computer-implemented method of claim 13, wherein the second application component is appended into the web page element and replaces the first application component.

19. The computer-implemented method of claim 13, wherein the second application component is appended into the web page element and is displayed at a same time as the first application component.

20. A computer-implemented method for integrating web application components, the method comprising:
registering, for each of a plurality of application components loadable by a web application, attributes and events defined for each of the plurality of application components;
receiving, from a client device executing the web application in a web browser, a request to load a first application component from the plurality of application components;
causing a loading of the first application component by the web application, wherein, upon loading, the first application component is rendered for display by the web application in the web browser;
based on the registering, receiving event data output from one of the events defined for the first application component responsive to an action performed via the displayed first application component;
storing the event data in a cache when at least a second application component from the plurality of application components, for which, based on the registering, the event data is indicated as an input of the second application component based on one of the attributes defined for the second application component, has yet to be loaded by the web application;
subsequent to the storing of the event data in the cache, receiving a request from the client device to load the second application component;
causing a loading of the second application component by the web application, wherein, upon loading, the second application component is rendered for display by the web application in the web browser; and
based on the registering indicating the event data is the input of the second application component based on the one of the attributes defined for the second application component and in response to the loading of the second application component, providing the stored event data from the cache to the client device for use as the input to the second application component.

* * * * *